United States Patent Office 3,488,310
Patented Jan. 6, 1970

3,488,310
UREA-MELAMINE-FORMALDEHYDE RESINS
Frank Paul McCombs, Granville, Ohio, assignor to Owens-Corning Fiberglas Corporation, a corporation of Delaware
No Drawing. Filed Feb. 24, 1967, Ser. No. 618,318
Int. Cl. C08g 37/30, 9/30, 9/32
U.S. Cl. 260—29.3                 18 Claims

ABSTRACT OF THE DISCLOSURE

Resin compositions suitable for use as saturants for decorative glass fiber board or tile products wherein the resin component is an infinitely water-soluble,[1] low viscosity, slow curing urea-melamine-formaldehyde or urea-melamine-formaldehyde-glycol condensate produced by a method which includes several additions and cook cycles with partial condensation at an acid pH and partial condensation at an alkaline pH. The resins are also useful as a cure accelerator for glass wool binders consisting essentially of a phenolic resole and added urea.

[1] The term "infinitely water-soluble" as used herein and in the appended claims to refer to a binder or saturating resin means that the binder or saturating resin has no cloud point and is soluble in or miscible with water in all proportions.

BACKGROUND OF THE INVENTION

Field of the invention

The invention relates to resin compositions which are suitable for use as saturants in the production of decorative glass fiber products.

Decorative glass fiber boards and tiles are made of compacted glass fiber mats which are saturated on a major exposed side or sides with a synthetic resin. After saturation and cure of the resin the boards are normally sanded to obtain a smooth surface, and then they are painted.

The glass fiber boards are saturated with the resin in order to form a film which covers loose ends of glass fibers, called whitecaps, which project therefrom. In addition, the cured saturant provides a barrier which prevents drops of uncured phenol-formaldehyde resin binder from dripping through and discoloring the paint or other decorative finish applied to the surface of the board. The drops or clumps of uncured binder fall onto the glass fiber mat at the time that the binder is being applied to the glass fibers as a result of a binder buildup in the forming hood. Because of the size and concentration of these drops, they often are not fully cured during the normal curing step.

In the manufacture of decorative glass fiber boards and tiles, it is desirable that the board saturant resin be capable of application from a water system for economic reasons, and also because of the proximity of fire which is present as a part of the manufacture of glass fibers. This makes the application of resins from a water system almost a necessity for safety reasons.

A preferred method for the production of decorative glass fiber boards, tiles, and similar products involves saturation of the bonded product by passing it, by means of a conveyor, beneath and into contact with a screen over which the resin composition (a water solution of the resin plus other additives) is flowed. The amount of the resin composition flowing over the screen and the rate of speed of the conveyor are varied to give the desired degree of saturation necessary to provide a continuous film. Usually, saturation of the board to a depth of ¼ inch to ½ inch is necessary to provide a continuous film. After saturation, the board is then moved by the conveyor through a heated forced air oven to cure the resin, after which paint or other decorative finishes are applied.

The time of cure of the board saturant is very important since a fast curing saturant may prematurely cure before the desired degree of saturation necessary to form a continuous film on the board has been achieved. A low viscosity of the saturant is also important for adequate flow of the saturant over the surface of the board. In addition, the board saturant should provide adequate wet strength in the final product.

Description of the prior art

Urea-formaldehyde and melamine-formaldehyde resins provide exceptional film properties which include among others a highly durable surface finish with good chemical resistance, good wet and dry strength, flexity, good adhesion, almost unlimited color possibilities, and fire resistance. As a consequence, these properties have heretofore made these resins the preferred saturant resins to be used in the production of decorative glass fiber boards and tiles.

In recent years, various water dispersible urea-melamine-formaldehyde resins have been formulated and successfully employed in the paper industry to provide high wet strength properties (U.S. 2,917,427), and as water resistant industrial adhesive bonding agents which are particularly suited and widely used in connection with plywood laminates (U.S. 2,898,324 and U.S. 2,675,338).

Other amino resins having good stability and suitable as adhesives and as impregnants for paper, textiles and other materials may be prepared by the etherification of methylol urea and methylolmelamine co-condensation products with a monohydric alcohol having 5 carbons or less. (See for example British Patent No. 683,630 and British Patent No. 544,581.)

The above mentioned resins and commercially available equivalents, however, have not been suitable for application to glass fiber boards and ceiling tiles due to their unsatisfactory flow and cure properties and general lack of sufficient water-solubility. It is desirable that such resins when used as glass fiber board saturants have extremely low viscosity and slow cure time, in addition to infinite water-solubility, for the reasons outlined above.

As a consequence, the synthetic resin used as a board saturant which has most nearly approximated the desired properties has been a mixture of water-soluble urea-formaldehyde and water-soluble melamine-formaldehyde resins. Still, this combination provides unsatisfactory flow and cure properties, is not infinitely water-soluble, and does not provide adequate wet strength in the final product.

Novel urea-melamine-formaldehyde and urea-melamine-formaldehyde-glycol condensate resins have now been invented which have excellent flow and slow cure properties, infinite water-solubility, and when used as a board saturant in the production of decorative glass fiber boards and other products provide good wet strength properties.

OBJECTS

It is, therefore, an object of this invention to provide novel urea-melamine-formaldehyde and urea-melamine-formaldehyde-glycol condensate resins which by reason of their slow cure, excellent flow properties, infinite water-solubility, and ability to impart wet strength to the finished product are particularly suitable for use as board saturants in the production of decorative glass fiber boards and ceiling titles.

Another object of this invention is to provide a method for producing an extremely low viscosity, water clear, stable urea-melamine-formaldehyde or urea-melamine-formaldehyde-glycol condensate resin which is infinitely water-soluble.

Still another object of this invention is to provide resin compositions for use as board saturants in the production of decorative glass fiber boards and tiles wherein the resin component is a novel urea-melamine-formaldehyde or urea-melamine-formaldehyde-glycol condensate.

A still further object of this invention is to provide glass fiber boards and tiles saturated and bonded with a novel resin composition consisting essentially of the urea-melamine-formaldehyde or urea-melagine-formaldehyde-glycol condensate resins of this invention.

Another object of this invention is to provide an improved method for producing glass fiber boards and tiles which are saturated and bonded with the novel resins of this invention.

Another object is to provide a resin which may effectively be used alone or in a synergistic combination with ammonium sulfate or equivalent to accelerate cure of wool binders consisting essentially of a phenolic resole and added urea, and to improve the compressive strength of products produced with said binders. A final object is to provide bonded glass fiber products which exhibit superior compressive strength.

SUMMARY OF THE INVENTION

The present invention is based on the discovery that novel urea-melamine-formaldehyde and urea-melamine-formaldehyde-glycol condensate resins having extremely low viscosity, A—A+ on the Gardner-Holdt scale for a solution of 52% [2] solids, and which have a slow cure time and infinite water-solubility may be prepared by a method which includes several addition and cook cycles with partial condensation at an acid pH and partial condensation at an alkaline pH, with the pH carefully controlled over a rather narrow range. Moreover, the unique properties of low viscosity, slow cure time, infinite water-solubility and wet strength of the novel urea-melamine-formaldehyde and urea-melamine-formaldehyde-glycol condensate resins have been found to be substantially affected by the time and temperature at each stage of condensation as well as by the choice of acidic and alkaline substances used for pH adjustment.

These same resins are effective in accelerating cure of standard wool binders consisting essentially of a phenolic resole and added urea, and surprisingly when used with ammonium sulfate or equivalent are more effective in shortening cure time than when either substance is used alone. Moreover, the compressive and tensile strength of glass fiber products produced with binders containing the inventive resins as a cure accelerator are greater than in products produced with binders containing conventional cure accelerators.

The invention will be more readily understood by means of the following specific examples which are given for the purpose of illustration and are intended in no way to limit the invention.

PREFERRED EMBODIMENTS

Example I

A suitable reaction kettle having heating and cooling means surrounding it and equipped with a stirrer, was charged with 281 lbs. of 52% formaldehyde and 12 lbs. water. Triethanolamine was then added to neutralize any formic acid present and to bring the pH up to 7.0 to 7.2. Stirring was commenced and continued throughout the various addition and cook cycles. A 106 lb. portion of the urea was then charged to the reaction kettle, and the contents were heated to a temperature of 204° F., and maintained for approximately 20 minutes to dissolve the urea. The temperature of the reaction mixture was then cooled to 195° F., and the pH was adjusted to 4.6 with 13% formic acid. Reaction was allowed to continue at 195° F. until a Gardner-Holdt viscosity of B+ had been reached. At this point the pH was raised to 7.5 by the addition of triethanolamine, and 87 lbs. of urea and 87 lbs. of water were then charged to the reaction kettle. The reaction mixture was then heated to and maintained at a temperature of about 175° F. for about 15 minutes to dissolve the urea. The pH was then adjusted to 7.5 to 8 with triethanolamine. A second quantity of 52% formaldehyde amounting to 182 lbs. was then charged to the reaction kettle and the pH adjusted to 7.5 to 8 with triethanolamine. The temperature of the reaction mixture was held at 170° F. while a 56 lb. quantity of melamine was charged to the kettle and thereafter until a Gardner-Holdt viscosity of A+ at 52% solids had been reached. This step required about 10 minutes. The resinous products were then cooled to room temperature, and the pH was adjusted to 8.0 with triethanolamine to maintain stability. The final resinous products were infinitely soluble in water, had a solids content of 56–57%, and an application efficiency [3] of 74%.

---
[3] Subsequently discussed.

Example II

A mixing tank having heating and cooling coils surrounding it and equipped with a stirrer, was charged with 100 lbs. of 52% formaldehyde, and 13.8 lbs. of diethylene glycol. Triethanolamine was then added to neutralize any formic acid present in the formaldehyde solution and to bring the pH up to 7.0 to 7.2. Agitation was begun and continued throughout the various addition cook cycles. A 42 lb. portion of urea was then charged to the tank followed by heating of the reactants to 205° F. This temperature was maintained for approximately 20 minutes to dissolve the urea. After dissolution of the urea, the reaction mixture was cooled to a temperature of 195° F. after which the pH was adjusted to 4.6 by the addition of phthalic anhydride. The temperature was maintained at 195° F. and the reaction continued until a "C" Gardner-Holdt viscosity at 52% solids had been attained. (This step required about 35 minutes.) After the desired viscosity had been reached, triethanolamine was added in order to adjust the pH to 7.2 and inhibit acid reaction. A 30 lb. portion of urea was then charged to the tank, resulting in the temperature of the reaction mixture dropping to 155° F. The temperature was then raised to 170° F. and held for about twenty minutes to dissolve the urea after which 32 lbs. of 52% formaldehyde was charged over a period of about 15 minutes. Triethanolamine was then added to adjust the pH to value in the range of 7.8 to 8. The temperature was maintained at 170° F. during the charging of 14.4 lbs. of recrystallized melamine. The reaction was allowed to proceed at 170° F. until a Gardner-Holdt viscosity of A+ at 52% solids was reached. This required about 30 minutes including the charging time. At the end of this period the condensate was cooled to about 70° F. by means of the water cooling coils, and the pH was adjusted to 7.5–8.0 with triethanolamine. The cooled resin had a specific gravity of 1.264, a solids content of 57–58%, a pH of 8, and was infinitely water soluble. The final viscosity was A+ at 52% solids on the Gardner-Holdt scale, and the resin remained stable for approximately 1 month. The rate of cure determined as Stroke Cure [4] was 55–60 seconds at 150° C.

In the method of Example I described above, the water is added solely for the purpose of adjusting the final solids content of the resinous product to about 60%. An equal ---
[2] All percents and parts expressed herein and in the appended claims refer to percents and parts by weight on a dry solids basis unless otherwise indicated.

[4] Subsequently discussed.

or slightly superior product can be produced by deleting the water in Example I since the stability of the resinous products is greater at a high solids content.

The essential difference between the resinous products produced by the method of Example I and the method of Example II is that a glycol is used in the procedure of Example II. It has been found that the presence of the glycol significantly improves flow of the resinous products and is a factor in increased wet strength when used as a saturant for bonded glass fiber boards. Therefore the preferred water-soluble urea-melamine-formaldehyde resinous product includes a certain quantity of a glycol. The term "glycol" as used herein and in the claims is meant to include all glycols and polyglycols. Diethylene glycol is especially preferred because superior wet strength is obtained thereby. Any water-soluble glycol, however, can be substituted for the diethylene glycol of Example II. Examples of such glycols which can be used include ethylene glycol, triethylene glycol, propylene glycol, hexanediol-2,3 and water-soluble polyglycols such as those sold by the Union Carbide Company, New York, under the trade names Polyethylene Glycol 400 and 600. The designation 400 and 600 refer to the molecular weights of the respective glycols.

In general, the reactants used are the standard commercially available grades. In the case of the formaldehyde, however, the commercially available formaldehyde solutions which contain from about 6% to about 15% methanol are less desirable because the methanol acts as an inhibitor to slow the reaction. Therefore, a formaldehyde solution containing not more than about 4% of methanol is preferably used. It is also preferred that the formaldehyde be more concentrated than 37%, e.g., from about 45% to about 55%, so that the reaction mixture has a solids content from about 50% to about 55%; the course of the reaction can then be followed by simple viscosity determinations, as discussed above. If a source containing more than about 55% of formaldehyde is used, additions of water to the reaction mixture to provide a resin solids content not higher than about 55% is desirable to achieve optimum wet strengths.

While the order of addition of the reactants is important, the method of addition is not critical. Any convenient means of addition is suitable. For best results, the reaction mixture should be agitated throughout the preparation of the resinous products.

In the preparation of the resins described in the above examples, it has been found that separate cook cycles are very important. Co-condensation of all of the components results in the formation of a high polymer network with a loss of water-solubility and low tensile strength values for cured, resin saturated, glass fiber boards and tiles.

The pH of each cook cycle has also been found to be critical in the retention of water-solubility and adequate strength properties. For example, if all the components are reacted at an alkaline pH then adequate wet strength will not be obtained in the cured resin saturated glass fiber board or tile. On the other hand, if all of the components are reacted at an acid pH, the condensation proceeds too rapidly with the consequent rapid loss of water-solubility. Therefore, partial reaction of the resin components at an acid pH and partial reaction of the resin components at an alkaline pH is necessary for the preservation of water-solubility and adequate wet strength.

The initial pH adjustment to 7.0–7.2 with triethanolamine is made solely for the purpose of neutralizing any formic acid which might be present in the formaldehyde solution.

The second pH adjustment can be to a pH of between 4.4 and 4.7 and preferably between 4.6 and 4.7. When the pH is below the range indicated above, the reaction proceeds very rapidly and is difficult to control. Water-solubility is rapidly lost at a very acid pH, i.e. below about 4.4. Above a pH of about 4.7 the reaction does not proceed rapidly enough.

The third pH adjustment can be to a value in the range of 7 to 9 after a Gardner-Holdt viscosity of B+ to F, measured at a solids content ranging from 50 to 55 percent, has been reached and prior to the charging of the second quantity of urea. This adjustment is made to prevent acid reaction. An adjustment to a pH in the range of 7.0–7.2 is preferred.

The melamine is charged while the reaction mixture is at a pH in the range of 7.5–9 and preferably about 8 to prevent extensive reaction with the already formed resinous products and the attendant loss of stability and water-solubility.

The melamine cannot be charged at the same time as the second quantity of formaldehyde since the result would be a shorter cure time as well as a loss of water-solubility.

Sodium hydroxide, which is widely used in the art for alkaline pH adjustment in the preparation of amino resins is undesirable in the instant invention because its use results in the loss of strength after cure. For example, a resin saturant composition identical with No. 2 (Table I, infra) except that NaOH was used for the alkaline pH adjustments was prepared and tested. This composition had a wet tensile strength of only 228 p.s.i. and a dry tensile strength of only 640 p.s.i. Even lower strengths, both wet and dry, were found when $Ca(OH)_2$ and MgO were used for the alkaline pH adjustments. Accordingly, the use of a fixed alkali for pH adjustment should be avoided where optimum strength is desired.

The use of alkanolamines is preferred for such alkaline pH adjustments. Suitable alkanolamines conform to the formula:

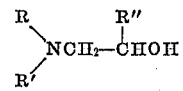

where R and R' are independently selected from the group consisting of hydrogen, alkyl radicals containing up to 4 carbon atoms, a beta-hydroxyethyl group and a beta-hydroxypropyl group, and R" is selected from the group consisting of hydrogen and methyl radicals. Examples of alkanolamines described by the above formula are ethanolamine, diethanolamine, triethanolamine, diethylaminoethanol, methyldiethanolamine and the like. It is especially preferred that triethanolamine be used as the pH adjusting agent because it contains no amino hydrogen atom to react with formaldehyde causing the pH to drop.

Other amines can be used for pH adjustment, however, such as diethylenediamine, diethylenetriamine, diethylamine, triethylamine, dipropylamine, and n-butylamine.

When the above mentioned amines which contain amino hydrogen atoms are used for alkaline pH adjustments, frequent additions are necessary in order to keep the pH within the prescribed limits.

Phthalic anhydride is preferred for use in acid pH adjustment over such acidic substances as formic acid, maleic anhydride, phosphoric acid, toluene sulfonic acid and equivalents which can also be used, because better wet strength in the glass fiber product and a higher application efficiency [5] of the resin is obtained thereby.

---

[5] The application efficiency under commercial conditions is one hundred times the weight of resin or binder composition in a given quantity of glass fiber product, divided by the number of pounds of binder composition, on a dry solids basis, used to produce that quantity of product. As reported herein, the application efficiency is determined by means of a Cone Test which consists of directing 10 cc. of the resin or saturant composition to be tested, at a 50% solids content from an atomizer through a cone made from glass fiber fabric, and determining the weight of resin retained on the glass fiber fabric cone after cure. The results from the Cone Test are used to determine the application efficiency by dividing the weight of resin solids deposited in the cone by the product of the specific gravity of the resin and the percent resin solids.

The application efficiency is commercially important since a high value indicates that a particular resin goes farther; that is, less is required to manufacture a given quantity of products than would be required using a resin having a low value. Considerable cost savings may be gained by using a resin with a high application efficiency value.

In addition to the careful pH control which must be maintained for each of the cook cycles, the time and temperature for each cook cycle is most important. After the charging of the first quantity of urea, the reaction kettle is initially heated to about 204° F. in order to bring the urea into solution. Since the pH is substantially neutral at this point there is little reaction. The exact temperature, therefore, is not critical, and a temperature as low as 160° F. and as high as 212° F. has been used.

In the cook cycle conducted at an acid pH, a temperature of between 160° F. and 205° F., and preferably between 190° F. and 200° F. is maintained until a Gardner-Holdt viscosity of between B+ and F at 52% solids is attained. A Gardner-Holdt viscosity of about C is most preferred because the final resin is then more stable and the resin saturated glass fiber product has a higher wet strength. Infinite water-solubility is lost if the viscosity is permitted to increase beyond a Gardner-Holdt viscosity of F.

After the second quantity of urea has been charged, a temperature of between 160° F. and 204° F. and preferably between 170° F. and 200° F. is maintained for a period of about twenty minutes or until the urea is solubilized. Here as stated above, the exact temperature is not critical, since there is a minimum of reaction at what is a substantially neutral pH.

In the cook cycle wherein the melamine is charged, a temperature of between 160° F. and 200° F. is maintained for a period of time which is sufficient to solubilize the melamine and to reach a Gardner-Holdt viscosity of at least A+ at 52% solids but not long enough to exceed infinite water solubility of the resin products. A temperature of about 170° F. is preferred since at this temperature the melamine is readily dissolved and the reaction is more easily controlled.

The mole ratios of the reactants are very important. In the final reaction mass, for each mole of urea theoretically present there should be from 1.7–2.55 moles of formaldehyde, .095–.175 mole melamine, and when used .109±20% mole glycol. In the preferred mole ratio of reactants, for each mole of urea theoretically present in the final reaction mass, there are 1.9 moles of formaldehyde, .095–.175 mole of melamine, and when used .109±10% mole of glycol.

The formaldehyde and the urea are each charged in two separate quantities. The first quantity of each is charged in proportion to give a molar ratio of the first quantity of formaldehyde to the first quantity of urea of 2.25–2.75 moles of formaldehyde per mole of urea; and when the glycol is used a mole ratio of the quantity of glycol to the first quantity of urea of .180–.257 mole of glycol per mole of urea. The second charge of formaldehyde should bring the overall mole ratio of formaldehyde to urea within the range of 1.7:1 to 2.55:1.

In the preferred mole ratio of reactants, the mole ratio of the first quantity of formaldehyde to the first quantity of urea is 2.5:1; the mole ratio of the second quantity of formaldehyde to the first quantity of formaldehyde is 0.32:1; the mole ratio of the second quantity of formaldehyde to the second quantity of urea is 1.1:1; and the mole ratio of the second quantity of urea to the first quantity of urea is 0.71:1.

When the urea-melamine-formaldehyde-glycol resins of this invention are used as board saturants for bonded glass fiber boards, tiles and similar products, usually at about 5 to 25 percent resin solids, it has been found that a superior product from the standpoint of both wet and dry tensile strength and a durable water repellent surface may be had by including a water solution of the resin about 0.25% based on resin solids of a water-soluble or water dispersible epoxy-functional silicon compound selected from the group consisting of silanes of the formula

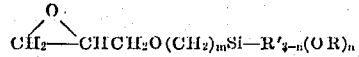

disiloxanes of the formula

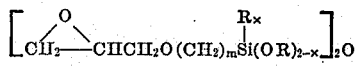

and polymers of the formula

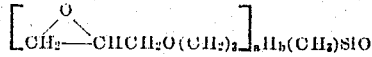

wherein each R and each R' is an aliphatic hydrocarbon radical of less than 4 carbon atoms, m is an integer greater than 1 and less than 4, n is an integer greater than 1 and less than 4, x is selected from 0, 1 and 2, a is greater than 0 and not more than 0.5, and b is at least 0.5 and less than 1.0. A preferred epoxy-silicon compound is a silane described by the first formula wherein m is 3 and n is 3. This compound is available from the Dow Corning Corporation, Midland, Mich. under the trade name Z–6040. The above described silicon based compounds are also valued for their lubricating and wetting action and especially for their coupling action toward glass fibers. The preferred amount to be used is 0.25% based on resin solids, but as much as 10% can be used to advantage.

The standard organosilicon compounds operable herein include those materials disclosed and claimed in U.S. Patent Nos. 2,588,365 and 2,588,366, issued Mar. 11, 1952; No. 2,728,692, issued Dec. 27, 1955; No. 2,807,601, issued Sept. 24, 1957; No. 2,884,393, issued Apr. 28, 1959; No. 2,833,022, issued May 6, 1958; and No. 2,842,509, issued July 8, 1959 and applications Ser. No. 662,336, filed May 29, 1957, and Ser. No. 738,599, filed May 29, 1958, all assigned to Dow Corning Corporation, and Patent No. 2,789,956, issued Apr. 23, 1957, assigned to Wacker-Chemie G.m.b.H.

The wet and dry tensile strength of bonded glass fiber boards saturated with a resin saturant composition as described above appears, in part, to be a function of the mole ratio of the formaldehyde and melamine in the resin composition.

The wet and dry strength values of boards saturated with a continuous film of resin saturant compositions comprising a 50% solids aqueous solution of resins produced according to the procedure of Example II using different mole ratios of formaldehyde and melamine to urea, combined with 0.25% of the epoxy-functional silicon compound Z–6040, are presented in Table I below.

The wet and dry tensile strength data given in Table I was determined from a binder-glass bead admixture composed of 36 parts of the resin saturant composition and 582 parts of soda lime glass beads. The resin saturant composition contained 18 parts of resin solids, 18 parts water, and .045 part of the epoxy-silicon compound Z–6040. The test specimens were produced by placing the saturant-glass bead composition against a pattern heated to a temperature of about 425° F. Portions of the saturant-glass bead admixture adhered to the heated pattern, and, after about a 7-minute cure, constituted a shell mold. For each saturant composition shown in Table I a shell mold was conditioned for 16 hours under ambient conditions of about 75° F. and 50% relative humidity to obtain the dry tensile strength value, and another shell mold was conditioned for 16 hours at 50° C. in an atmosphere of substantially 100% relative humidity to obtain the wet tensile strength value. Each tensile strength value is given in pounds per square inch. The above described test is hereafter referred to as the Shell Mold Test.

and 4 parts of emulsified mineral oil.[9] Agitation was continued for 5 minutes after the ammonium sulfate addi-

TABLE I

| Resin saturant composition | Mole ratio of reactants per mole of urea | | | | Tensile strength (lbs./in.²) | |
|---|---|---|---|---|---|---|
| | Formaldehyde | Melamine | Diethylene Glycol | Propylene Glycol | Wet | Dry |
| 1 | 1.7 | .095 | .109 | | 256 | 762 |
| 2 | 1.9 | .095 | .109 | | 252 | 783 |
| 3 | 1.9 | .175 | .109 | | 432 | 940 |
| 4 | 1.9 | .16 | .109 | | 277 | 449 |
| 5 | 1.9 | .14 | .109 | | 251 | 530 |
| 6 | 2.25 | .14 | .109 | | 350 | 1,010 |
| 7 | 2.55 | .14 | .109 | | 203 | 611 |
| 8 | 1.9 | .095 | | *.151 | 262 | 517 |

* The resin used in this saturant composition was prepared according to the procedure of Example II using .151 mole of propylene glycol/mole of urea instead of the .109 mole of diethylene glycol.

Example III

The resin composition produced as described in Example II was used to saturate bonded glass fiber boards which were prepared in the following conventional manner.

A phenol-formaldehyde resole having a mole ratio of formaldehyde to phenol of approximately 2.7:1 was first prepared in the following manner:

A reaction vessel equipped with a propeller-type agitator was charged with 51.15 pounds of 52% formaldehyde, 31 pounds of phenol, and 2.5 pounds of barium oxide which had been dissolved in 1.3 gallons of water. The resulting charge was heated for a total of 10½ hours during which time it was stirred continuously. The charge was first heated to and maintained at a temperature of 100° F. for 2 hours, heated to and held at a temperature of 110° F. for 1½ hours, heated to and held at a temperature of 125° F. for 2 hours, and finally heated to and held at a temperature of 140° F. for approximately 5 hours or until a free formaldehyde content of 4.4% to 4.7% had been reached. The resole was then cooled to below 100° F. and neutralized with dilute (20% maximum) sulfuric acid to a pH of 7.3±0.1. The resole had a solids content of 45.5%, weighed 9.9 pounds per gallon and the cure time, determined as Stroke Cure [6] was 105 to 125 seconds. Infrared absorption analysis of the reaction mixture indicated that the resole was substantially free of unreacted phenol and also of methylene groups.

A binder composition was then prepared in a mixing tank provided with a propeller-type agitator, which tank was first charged with sufficient water to give a final solids content of about 20%, and the water and subsequently charged ingredients were stirred during the formulation of the binder composition. A 0.25 part portion of a mixture of 90% of an aminoalkyl silane having the formula $H_2N(CH_2)_2NH(CH_2)_3Si(OCH_3)_3$ and 10% of a silicone block polymer [7] was charged to the tank, followed by 0.5 part ammonium sulfate, 30 parts of urea, 55 parts of the phenolic resole produced as described above, sufficient ammonia to give a pH of 8.5, 10 parts of the resin of Example II, 5 parts of pinewood pitch extract,[8]

[6] Subsequently discussed.
[7] The copolymer is identified in U.S. Patent 3,081,269, column 10, footnote 1.
[8] The extract used is resinous in nature and can be isolated as described in U.S. Patent 2,391,368 (page 2, column 1, lines 34 and following). It had the following analysis: 6% high melting furfural condensate (methanol insoluble) ; 4% neutral oils (hydrocarbons, esters and ethers) ; 9% rosin ; 5% belro-phenol-lactone (probably $C_{18}H_{11}O_{3.2}(OCH_3OH)$ ; 5% flavone-type polyphenol (possibly about $C_{15}H_7O_{2.5}OH)$ ; 2% humic acid-type compounds ; 0.2% pectic acid-type compounds ; 6% air oxidized rosin acids (unfused) ; 3% strongly acidic compounds ; 38% weakly acidic, high melting phenolic compounds ; 19% relatively neutral phenol ethers and esters ; and 1% water-soluble carbohydrates, etc.

tion to assure substantial uniformity of the completed binder composition.

The binder composition was sprayed into a forming hood through which glass fibers were being projected onto a foraminous conveyor. The fibers were collected in the form of a randomly intermeshed wool-like mass associated with the binder composition. The relative proportion of associated binder was such that the binder, after cure, constituted approximately 11 percent of the total wool-like mass. Cure was accomplished in an oven maintained at a temperature of about 500° F. in which the glass fibers and associated binder were exposed for about 2 minutes by passage therethrough and within which the mass was compressed sufficiently that 1¼ inch thick boards having apparent densities of about 9 lbs. per cubic foot were produced. The boards were cut into 2-foot by 4-foot lengths, sanded lightly, and saturated as described below.

A saturate composition was prepared from the urea-melamine-formaldehyde-diethylene glycol resin of Example II by adding the resin to a mixing tank and diluting with water to give a solution of 11% by weight resin solids, and admixing with 0.25% based on resin solids, of the epoxy-functional silicon compound Z–6040 having the formula

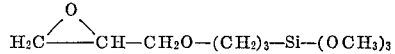

The boards were charged onto a foraminous conveyor and advanced beneath and into contact with a 30 mesh screen having a width of 9 inches and a length equal to the width of the conveyor and coextensive therewith. The screen was disposed over the conveyor and formed the bottom of a trough which was kept filled to a constant level of 5 inches with the above described saturant composition. As the boards were brought into contact with the screen a continuous film of the resin flowed over and saturated the top surface of the boards to a depth of about ¼ to ½ inch. The excess resin was collected in a trough disposed below the conveyor, and subsequently filtered and returned to the trough over the conveyor. The saturated boards were then passed in about 3 minutes through a heated forced air oven at a temperature of 450° F. during which the resin was cured and dried on the boards. An examination of the finished boards showed a continuous

[9] The particular mineral oil was a petroleum fraction sold under the trade name Anarco 1411C by the Ashland Oil Co., Ashland, Ohio. The oil has a flash point (Cleveland Open Cup) of between 580° F. and 585° F. It was emulsified with Mornel X–914, a synthetic petroleum sulfonate, oil cut, sold by the the Morton-Withers Chemical Co., of Greensboro, N.C. and with Triton X–114, an alkyl aryl polyether sold by the Rohm and Haas Co. of Philadelphia, Pa. The emulsifying agents were used in the proportion of 2 parts Triton to 1 part Morpel, and the combination in proportion of 2–10 parts to 100 parts of the petroleum fraction.

cured film of the resin with no whitecaps in evidence and when the boards were painted, no phenol-formaldehyde resins dripped through and discolored the boards.

It will be noted that the resin of Example II was added to the binder used in producing the boards saturated as described in the preceding paragraph.

It has been found that such additions to binder compositions consisting essentially of a phenolic resole and added urea in an aqueous system materially accelerate cure. Such additions of the urea-formaldehyde-melamine resin of Example I or of mixtures of the two resins similarly accelerate cure. The use of a combination of the board saturant resin and a cure accelerator such as ammonium sulfate as used in the binder of Example III accelerates cure of the binder more than either substance when used alone. Moreover, the bonded glass fiber products produced with such binder compositions exhibit higher wet and dry tensile strengths and greater compressive strength than do similar products produced with binder compositions containing conventional cure accelerators.

The example which follows demonstrates the superior properties of the inventive resin of Example II as compared with a standard urea-formaldehyde resin when used with ammonium sulfate to shorten cure time of a phenolic resole-urea binder and to improve tensile strength of glass fiber products bonded therewith.

EXAMPLE IV

A first binder composition was prepared by thorough mixing in a reaction vessel of the following ingredients listed in the order of their addition:

65 parts of a phenolic resole produced as described in Example III
35 parts of urea as a 50% water solution
10 parts of urea-formaldehyde resin[10]
5.5 parts of ammonium sulfate as a 10% water solution
0.25 part of gamma-aminopropyltriethoxysilane A similar second binder composition was prepared in the same manner in a different reaction vessel by thorough mixing of the following ingredients listed in the order of their addition:

65 parts of a phenolic resole produced as described in Example III
35 parts of urea as a 50% water solution
10 parts of the urea-formaldehyde-melamine-glycol resin of Example II
5.5 parts of ammonium sulfate as a 10% water solution
0.25 part of gamma-aminopropyltriethoxysilane

---

[10] This resin was prepared in a manner similar to that of Example I, except that no melamine was added.

The rate of cure for each of the binder compositions was determined by the results of Stroke Cure and Film Cure. Stroke Cure represents the time required for 10 cc. of the binder composition at 50% solids to advance to a stringy stage on a cure plate at a temperature of 150° F. Film Cure represents the time required to advance 10 cc. of the binder composition at 50% solids to the stage of a firm cured film. In evaluating the results for cure time, more weight should be given to the values for Film Cure. This is because in the test for Stroke Cure, the binder continues to cure after the stringy stage has been reached and the heat has been taken away. This is not the case with the test for Film Cure. The tensile strength for boards bonded with the above binders was determined by the Shell Mold Test.

The results of the Shell Mold Test, Stroke Cure and Film Cure for each binder are presented below in tabulated form.

| Property | Binder No. 1, containing a urea-formaldehyde resin | Binder No. 2, containing the urea-formaldehyde-melamine-glycol resin of Example II |
|---|---|---|
| Stroke cure (seconds) | 160 | 155 |
| Film cure (seconds) | 270 | 210 |
| Wet tensile strength (lbs./in.²) | 392 | 630 |
| Dry tensile strength (lbs./in.²) | 680 | 847 |

In Table II below, the properties of Stroke Cure and Film Cure, Wet and Dry Tensile Strength as determined by the Shell Mold Test, and Application Efficiency are presented for binder compositions similar to Binder No. 2 above but wherein the amounts, per 100 parts of the phenolic resole produced as described in Example III, of added urea, ammonium sulfate, and the urea-formaldehyde-melamine-glycol resin of Example II, or the urea-formaldehyde-melamine resin of Example I are varied in each case. It should be noted that the cure time of a phenolic resole binder composition increases as a direct function of the amount of added urea.

TABLE II

| No. | Phenol formaldehyde resin | Urea | (NH₄)₂SO₄ | Board saturant resin of Example I | Board saturant resin of Example II | Stroke cure | Film cure | Wet tensile strength | Dry tensile strength | Application efficiency, percent |
|---|---|---|---|---|---|---|---|---|---|---|
| 1 | 100 | 40 | 0 | 0 |  | 200 | >240 |  |  |  |
| 2 | 100 | 40 | 0 |  | 28 (¹ 20%) | 150 | 210 |  |  |  |
| 3 | 100 | 40 | 0.5 |  | 14 (¹ 10%) | 135 | 180 | 700 | 920 | 74.5 |
| 4 | 100 | 50 | 0 | 0 |  | 210 | 260 |  |  |  |
| 5 | 100 | 50 | 0 |  | 30 (¹ 20%) | 210 | 300 |  |  |  |
| 6 | 100 | 50 | 0.5 |  | 15 (¹ 10%) | 155 | 210 | 636 | 784 | 70.0 |
| 7 | 100 | 60 | 0 | 0 |  | 210 | 280 |  |  |  |
| 8 | 100 | 60 | 0 |  | 16 (¹ 10%) | 180 | 270 |  |  |  |
| 9 | 100 | 60 | 1.0 |  | 16 (¹ 10%) | 170 | 260 |  |  |  |
| 10 | 100 | 60 | 1.0 |  | 32 (¹ 20%) | 130 | 210 | 536 | 788 | 68.3 |
| 11 | 100 | 70 | 0 | 0 |  | 210 | >280 |  |  |  |
| 12 | 100 | 70 | 0 |  | 17 (¹ 10%) | 180 | 270 |  |  |  |
| 13 | 100 | 70 | 1.0 |  |  | 155 | >240 |  |  |  |
| 14 | 100 | 70 | 1.0 |  | 17 (¹ 10%) | 180 | 240 |  |  |  |
| 15 | 100 | 70 | 1.0 |  | 34 (¹ 20%) | 120 | 210 | 452 | 560 | 62.8 |
| 16 | 100 | 50 | 0 | 15 (¹ 10%) |  | 180 | ² 270 |  |  |  |
| 17 | 100 | 60 | 0 | 10 (¹ 6.25%) |  | 180 | ² 270 |  |  |  |
| 18 | 100 | 70 | 0 | 10 (¹ 5.9%) |  | 180 | ² 270 |  |  |  |

¹ Based on solids of phenol-formaldehyde resin and urea.   ² Approximately.

It can be seen from an examination of Table II, that the board saturant resins of Examples I and II are effective in shortening cure of phenolic resole binders containing added urea. Also, it has been found that the combination of such resins with ammonium sulfate is unique since the cure time is shortened to a greater extent than when either substance is used alone.

When used as a cure accelerator for wool binders comprising a phenolic resole and added urea, it is preferred that the board saturant resin be added in an amount of from 5 percent to 20 percent of the total bonding solids, i.e., the resole and urea. The optimum amount will depend upon the amount of the added urea. That is, since urea has the effect of lengthening cure time, more of the board saturant resin will be required to shorten cure time for binders containing greater amounts of added urea.

When a combination of the board saturant resin and ammonium sulfate is used, it is preferred that the ammonium sulfate be added in amounts of 0.5 percent to 5 percent based on the bonding solids of the resole and urea.

As previously stated, the use of the inventive resins of Example I and especially of Example II in binder compositions consisting essentially of a phenolic resole and added urea in an aqueous system accelerate cure, and additionally, improves the compressive strength of glass fiber boards produced with such binders over the compressive strength of standard binders containing conventional cure accelerators.

In Examples V and VI which follow, the production of bonded glass fiber boards is described. Standard phenolic resole-urea binders are used, in one case containing a conventional cure accelerator and in another case containing the resin of Example II and ammonium sulfate as a cure accelerator. The compressive strength properties of the bonded board products are also compared.

Example V

A first binder composition was prepared from a portion of the phenolic resole produced as described in Example III and urea, using the urea-melamine-formaldehyde-glycol board saturant resin of Example II and ammonium sulfate to accelerate cure. The binder composition was prepared in a mixing tank provided with a propeller-type agitator, which tank was first charged with water,[11] and the water and subsequently charged ingredients were stirred during the formulation of the binder composition. A 0.25 part portion of an aminoalkyl silane [12] was first added followed by 1 part of ammonium sulfate, 30 parts of urea, 10 parts of the urea-melamine-formaldehyde-glycol resin of Example II, sufficient ammonia to give a pH of at least 8.5, 60 parts of the phenolic resole produced as described in Example III and 4 parts of the previously described mineral oil emulsion. Agitation was continued for five minutes after the last addition to assure substantial uniformity of the completed binder composition.

The binder composition produced as described above was used to produce bonded glass fiber boards in the following conventional manner.

The binder composition was sprayed into a forming hood through which glass fibers were being projected onto a foraminous conveyor. The fibers were collected in the form of a randomly intermeshed wool-like mass associated with the binder composition. The relative proportion of associated binder was such that the binder, after cure, constituted substantially 9.0 percent of the total wool-like mass. Cure was accomplished in an oven maintained at a temperature of about 500–525° F. in which the glass fibers and associated binder were exposed for about 1½–2 minutes by passage therethrough and within which the mass was compressed sufficiently that 1¼ inch thick boards having apparent densities of about 6½ pounds per cubic foot were produced.

For purposes of comparison, and not according to the invention, a second binder composition containing a conventional cure accelerator was produced in the same manner as the binder of Example V from the following ingredients:

Water [13]
0.25 part aminoalkyl silane [14]
0.5 part ammonium sulfate
30 parts of urea
Sufficient ammonia to give a pH of 8.5
60 parts of the resole of Example II
10.1 parts of pitch solo [15]

[13] Sufficient to provide a final solids content of about 20 percent.
[14] See Example V for formula.
[15] A tall oil pitch-pinewood pitch extract composition comprising an aqueous dispersion containing, per 100 parts thereof, 20¾ parts of tall oil pitch having a flash point of substantially 530° F., and 20¾ parts of pinewood pitch extract.

Board-like products were produced according to the method described in Example V using the above binder composition.

The boards produced as described above in Example V and those produced for purposes of comparison were tested for compressive strength. The test, which is a standard, accelerated weathering test, consisted of determining the load in pounds per 25 square inches of the board which was required to compress the board to ¾ of its original thickness. The test was made on the boards as produced and after autoclaving for periods ranging from 15 minutes to 8 hours. The test showed that the boards produced with binders containing the board saturant of Example II and ammonium sulfate as a cure accelerator had greater compressive strength than boards produced with binders containing a conventional cure accelerator. The test also showed the boards produced as described in Example V to meet all established production standards.

Example VI

Another binder composition according to the invention was prepared as described in Example V from the ingredients listed below in the order of addition:

| Ingredients: | Parts by weight |
|---|---|
| Water | (1) |
| Aminoalkyl silane [2] | 0.25 |
| Ammonium sulfate | 1.0 |
| Urea | 40 |
| A urea-melamine-formaldehyde-glycol resin produced as described in Example II | 10 |
| Ammonium hydroxide:[3] | |
| A phenolic resole produced as described in Example III | 50 |
| Mineral oil emulsion (previously described) | 10 |

[1] Sufficient water was used to provide a final resin solids content of about 22 percent.
[2] The particular aminoalkyl silane used had the formula $NH_2C_2H_4NHC_3H_6Si(—OCH_2CH_3)_3$.
[3] Sufficient ammonium hydroxide was used to provide a final pH of substantially 8.5.

Board-like products were produced by the method generally described in Example V, but using a sufficient proportion of the binder produced as described in the preceding paragraph that the binder, after cure, constituted substantially 11½ percent of the total product; in addition, the production was controlled to produce boards substantially 1 inch in thickness, and having an apparent density of 9.0 pounds per cubic foot. Samples of the resulting boards were subjected to the accelerated weathering test described in Example V, and were found to meet all established production standards.

In the binder formulations of Examples V and VI, the aminoalkyl silane is used to provide water repellency and to improve the dry and especially the wet strength of the bonded product. Fibrous products bonded with compositions containing such silanes withstand hot humid conditions without loss of strength. The aminoalkyl silanes

[11] Sufficient water was added to give a final solids content of about 20%.
[12] The particular aminoalkyl silane used had the formula $NH_2C_2H_4NHC_3H_6Si(—OCH_2CH_3)_3$.

which are conventionally used in binder compositions have the general formula, $$R_n\text{—}Si\text{—}(\text{—}OR')_{(4-n)}$$

wherein R is an aminoalkyl radical chemically bonded to the silicon atom, R' is an alkyl radical having from 1 to 4 carbon atoms, and n is an integer from 1 to 3 inclusive. The aminoalkyl silane is normally added in an amount which can range from about 0.02 to about 2 percent based on bonding resin solids (resole and urea).

The oil in the binder compositions of Examples III, V and VI is used to improve the feel of the glass fiber product and the Pinewood Pitch Extract or Pinewood Pitch extract-Tall Oil pitch blend are reactive extenders for the binder composition. The ammonia is added to control pH to one which is alkaline and thereby increase the stability of the binder. Ammonium sulfate is added to accelerate cure. Such materials and the equivalents therefor can be used in accordance with the invention but are not essential.

It will be apparent that various changes and modifications can be made from the specific details set forth herein without departing from the spirit and scope of the invention as defined in the appended claims.

1. A method of making an infinitely water-soluble, liquid urea-melamine-formaldehyde resinous product wherein the reactants have an overall mole ratio per mole of urea of 1.7–2.55 moles of formaldehyde, and .095–.175 mole melamine, comprising the steps of:
    (a) dissolving a first charge of urea in formaldehyde, in proportions to give a mole ratio of the first urea charge to formaldehyde of 2.25:1 to 2.75:1;
    (b) adjusting the temperature of the reaction mixture to one in the range of 160° F. to 204° F.;
    (c) adjusting the pH to one in the range of 4.5 to 4.7;
    (d) condensing the reactants at a temperature in the range of 160° F. to 204° F. to a Gardner-Holdt viscosity measured at 52% resin solids of B+ to F;
    (e) adjusting the pH of the reaction mixture to a value in the range of 7.0 to 9 with an organic amine;
    (f) dissolving a second urea charge in the reaction products in proportion to give a mole ratio of the second urea charge to the first urea charge of ½:1 to 1:1;
    (g) adding a second charge of formaldehyde in proportion to give an overall mole ratio of formaldehyde to urea of from 1.7:1 to 2.55:1;
    (h) adjusting the pH if necessary to 7.8 to 9.0 with an organic amine;
    (i) adding melamine in proportion to give an overall mole ratio of melamine per mole of total urea added of .095:1 to .175:1;
    (j) heating the reaction mixture at a temperature not higher than the reflux temperature for a time sufficient to solubilize the melamine and to cause condensation to a Gardner-Holdt viscosity measured at 52% resin solids of at least A+, but insufficient to exceed infinite water-solubility of the reaction products;
    (k) cooling the reaction mixture to room temperature;
    (l) adjusting the pH, if necessary, to 7.5–8.0 with an organic amine or an acid.

2. A method as claimed in claim 1 wherein the mole ratio of the second urea charge to the first urea charge is about ¾:1.

3. A method as claimed in claim 1 wherein the formaldehyde used is substantially neutral.

4. A method of making an infinitely water-soluble liquid urea-melamine-formaldehyde resinous product as claimed in claim 1 wherein the reactants include a water-soluble glycol in an overall mole ratio of .109±20% mole glycol per mole of urea which is added to the reaction mixture of step (a) in proportion to give a mole ratio of .185±20%.

5. A method of making an infinitely water-soluble, liquid urea-melamine-formaldehyde resinous product as claimed in claim 1 wherein:
    (1) the reactants have an overall mole ratio of 1.9 moles of formaldehyde, and .095–.175 mole melamine per mole of urea;
    (2) in steps (b) and (d), the reaction mixture is heated to a temperature in the range of 190° F. to 200° F., and in step (j) to a temperature in the range of 160° F. to 170° F.;
    (3) in step (c) the acid pH adjustment is made with an acidic substance selected from the group consisting of phthalic anhydride, maleic anhydride, formic acid, phosphoric acid, and toluene sulphonic acid;
    (4) the organic amine of steps (e), (h) and (l) is one selected from the group consisting of diethylenediamine, diethylenetriamine, triethylamine, n-butylamine and alkanolamines of the formula

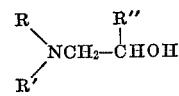

where R and R' are independently selected from the group consisting of hydrogen, alkyl radicals containing up to 4 carbon atoms, a beta-hydroxyethyl group and a beta-hydroxypropyl group, and R'' is selected from the group consisting of hydrogen and methyl radicals;
    (5) in step (g) the formaldehyde is added in proportion to give a mole ratio of the second formaldehyde charge to the first formaldehyde charge of .32:1, and a mole ratio of the second formaldehyde charge to the second urea charge of 1.1:1.

6. A method of making an infinitely water-soluble, liquid urea-melamine-formaldehyde resinous product as claimed in claim 5 wherein the reactants include a water-soluble glycol selected from the group consisting of ethylene glycol, diethylene glycol, triethylene glycol, propylene glycol, and water-soluble polyglycols in an overall mole ratio of .109±10% mole glycol per mole of urea and which is added to the reaction mixture of step (a) in proportion to give a mole ratio of .185±10% mole glycol per mole of the first quantity of urea.

7. A method of making an infinitely water-soluble, liquid urea-melamine-formaldehyde-glycol resinous product as claimed in claim 6 wherein:
    (1) the water-soluble glycol is diethylene glycol;
    (2) the acid substance is phthalic anhydride;
    (3) the organic amine is triethanolamine.

8. An infinitely water-soluble, liquid urea-melamine-formaldehyde resinous product wherein the reactants have an overall mole ratio of 1.7–2.55 moles of formaldehyde, and .095–.175 mole melamine per mole of urea produced by the method of claim 1.

9. An infinitely water-soluble, liquid urea-melamine-formaldehyde-glycol resinous product wherein the reactants have an overall mole ratio of 1.7–2.55 moles of formaldehyde, .095–.175 mole melamine, and .109±20% mole glycol per mole of urea produced by the method of claim 4.

10. An aqueous resin saturant composition comprising the infinitely water-soluble, liquid urea-melamine-formaldehyde resinous product of claim 8 and from 0.25% to 10% based on resin solids of an epoxy-functional compound selected from the group consisting of silanes of the formula

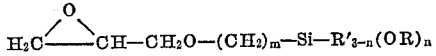

disiloxanes of the formula

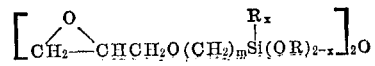

and polymers of the formula

wherein each R and each R' is an aliphatic hydrocarbon radical of less than 4 carbon atoms, $m$ is an integer greater than 1 and less than 4, $n$ is an integer greater than 1 and less than 4, $x$ is selected from 0.1, and 2, $a$ is greater than 0 and not more than 0.5, and $b$ is at least 0.5 and less than 1.0.

11. An aqueous resin saturant composition comprising the infinitely water-soluble, liquid urea-melamine-formaldehyde-glycol resinous product of claim 9 and from 0.25% to 10% based on resin solids of an epoxy-functional compound selected from the group consisting of silanes of the formula $$H_2C \overset{O}{-\!\!-\!\!-} CH-CH_2O-(CH_2)_m-Si-R'_{3-n}(OR)_n$$

disiloxanes of the formula

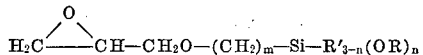

and polymers of the formula

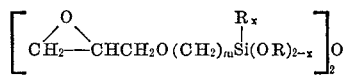

wherein each R and each R' is an aliphatic hydrocarbon radical of less than 4 carbon atoms, $m$ is an integer greater than 1 and less than 4, $n$ is an integer greater than 1 and less than 4, $x$ is selected from 0, 1, and 2, $a$ is greater than 0 and not more than 0.5, and $b$ is at least 0.5 and less than 1.0.

12. An aqueous resin saturant composition as claimed in claim 11 wherein the epoxy-functional compound is a silane having the formula

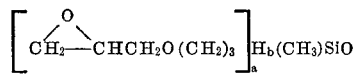

13. In a method for producing fibrous boards and tiles having at least one major surface saturated with a continuous film of cured resin wherein the fibrous board products are composed of a mass of intermeshed glass fibers disposed in an open, non-woven arrangement and a hardened synthetic resinous binder material bonding said fibers to one another at points of contact which method includes the steps of:
applying a continuous film of an aqueous resin saturant composition onto a major surface of the board, and
heating to cure the resinous film on the board;
the improvement comprising using as the aqueous resin saturant the composition of claim 10.

14. A glass fiber board product which comprises a mass of intermeshed glass fibers disposed in an open, non-woven arrangement, a hardened synthetic resinous binder material bonding said fibers to one another at points of contact and having at least one major surface saturated with a continuous cured film of the resin saturant composition of claim 10.

15. An aqueous binder composition for glass and other vitreous fibers comprising on a dry solids basis from 90% to 20% of a phenolic resole; from 10% to 80% of urea; and as a cure accelerator, from 5% to 20% based on the total amount of combined resole and urea, of the infinitely water - soluble urea - melamine - formaldehyde resin of claim 8.

16. The aqueous binder composition of claim 15 wherein the cure accelerator further comprises from 0.1% to 5% based on the total amount of combined resole and urea, of ammonium sulfate.

17. A glass fiber product having superior compressive strength which comprises a mass of intermeshed glass fibers disposed in an open, non-woven arrangement and a hardened synthetic resinous binder material bonding said fibers to one another at points of contact, wherein said synthetic resinous binder marterial comprises the cured binder composition of claim 15.

18. A method of making an infinitely water-soluble, liquid urea-melamine-formaldehyde resinous product wherein the reactants have an overall mole ratio per mole of urea of 1.7–2.55 moles of formaldehyde, and .095–.175 mole melamine, comprising the steps of:
(a) dissolving a first charge of urea in formaldehyde, in proportions to give a mole ratio of the first urea charge to formaldehyde of 2.25:1 to 2.75:1;
(b) adjusting the temperature of the reaction mixture to one in the range of 160° F. to 204° F.;
(c) adjusting the pH to one in the range of 4.5 to 4.7;
(d) condensing the reactants at a temperature in the range of 160° F. to 204° F. to a Gardner-Holdt viscosity measured at 52% resin solids of B+ to F;
(e) adjusting the pH of the reaction mixture to a value in the range of 7.0 to 9;
(f) dissolving a second urea charge in the reaction products in proportion to give a mole ratio of the second urea charge to the first urea charge of ½:1 to 1:1;
(g) adding a second charge of formaldehyde in proportion to give an overall mole ratio of formaldehyde to urea of from 1.7:1 to 2.55:1;
(h) adjusting the pH if necessary to 7.8 to 9.0;
(i) adding melamine in proportion to give an overall mole ratio of melamine per mole of total urea added of .095:1 to .175:1;
(j) heating the reaction mixture at a temperature not higher than the reflux temperature for a time sufficient to solubilize the melamine and to cause condensation to a Gardner-Holdt viscosity measured at 52% resin solids of at least A+, but insufficient to exceed infinite water-solubility of the reaction products;
(k) cooling the reaction mixture to room temperature;
(l) adjusting the pH, if necessary, to 7.5–8.0.

References Cited

UNITED STATES PATENTS

| | | | |
|---|---|---|---|
| 2,898,324 | 8/1959 | Mackay | 260—67.6 |
| 2,990,307 | 6/1961 | Stalego | 260—849 |
| 3,218,320 | 11/1965 | Christoffel et al. | 260—67.6 |
| 3,261,795 | 7/1966 | Goullon et al. | 260—849 |

MURRAY TILLMAN, Primary Examiner

J. C. BLEUTGE, Assistant Examiner

U.S. Cl. X.R.

117—126, 161; 156—331; 161—170, 185, 198; 260—25, 29.4, 67.6, 826, 839, 849